United States Patent
Willis et al.

(10) Patent No.: US 6,385,647 B1
(45) Date of Patent: May 7, 2002

(54) SYSTEM FOR SELECTIVELY ROUTING DATA VIA EITHER A NETWORK THAT SUPPORTS INTERNET PROTOCOL OR VIA SATELLITE TRANSMISSION NETWORK BASED ON SIZE OF THE DATA

(75) Inventors: Dean Willis; Jim Howser; Marty Garrity, all of Richardson, TX (US); Jack Heneghan, Colorado Springs, CO (US)

(73) Assignee: MCI Communications Corporations, Washington, DC (US)

( * ) Notice: Subject to any disclaimer, the term of this patent is extended or adjusted under 35 U.S.C. 154(b) by 0 days.

(21) Appl. No.: 08/912,052

(22) Filed: Aug. 18, 1997

(51) Int. Cl.[7] .............................................. G06F 13/00
(52) U.S. Cl. ..................................................... 709/217
(58) Field of Search ................................. 709/238, 230, 709/231, 235, 237, 200, 201, 203, 217, 218, 219; 714/748

(56) References Cited

U.S. PATENT DOCUMENTS

| | | | | |
|---|---|---|---|---|
| 5,553,083 A | * | 9/1996 | Miller ........................... | 371/32 |
| 5,572,678 A | * | 11/1996 | Homma et al. ............... | 709/227 |
| 5,727,002 A | * | 3/1998 | Miller et al. .................. | 714/748 |
| 5,757,784 A | * | 5/1998 | Liebowitz et al. ........... | 370/321 |
| 5,812,545 A | * | 9/1998 | Liebowitz ..................... | 370/337 |
| 5,852,721 A | | 12/1998 | Dillon et al. .................. | 709/235 |
| 5,968,129 A | * | 10/1999 | Dillon et al. .................. | 709/233 |
| 5,987,233 A | * | 11/1999 | Humphrey ..................... | 709/217 |
| 5,991,596 A | * | 11/1999 | Cunningham et al. ...... | 455/12.1 |
| 6,108,706 A | * | 8/2000 | Birdwell et al. ............. | 709/229 |
| 6,115,750 A | | 11/2000 | Dillon et al. ................. | 709/235 |
| 6,172,972 B1 | * | 1/2001 | Birdwell et al. ............. | 370/349 |
| 6,266,339 B1 | * | 7/2001 | Donahue et al. ............ | 370/432 |

FOREIGN PATENT DOCUMENTS

| | | |
|---|---|---|
| EP | 0779716 A | 6/1997 |
| WO | 9720413 A | 6/1997 |
| WO | 9727546 A | 7/1997 |

OTHER PUBLICATIONS

Hurwicz, Mike: "Multicast To The Masses" Byte, vol. 22, No. 6, Jun. 1997, pp. 93–97.

* cited by examiner

*Primary Examiner*—Moustafa M. Meky

(57) ABSTRACT

Data files, video and audio data, telephone calls, and other multimedia information is multicast through a hybrid network which includes orbiting satellites and the Internet. The multimedia information is multicast to a receiving facility via an orbiting satellite or the Internet. If the status of the transmission indicates that the transmission was unsuccessful, the receiving computer will transmit a failure status to the source, and the source will transmit the multimedia information to the receiving computer, thus providing reliable data delivery. The multicast data is received by a receiving facility and the data is transmitted via industry standard non-proprietary mechanisms utilizing Internet Protocol to each of the destination computers that are members of the multicast group.

22 Claims, 11 Drawing Sheets

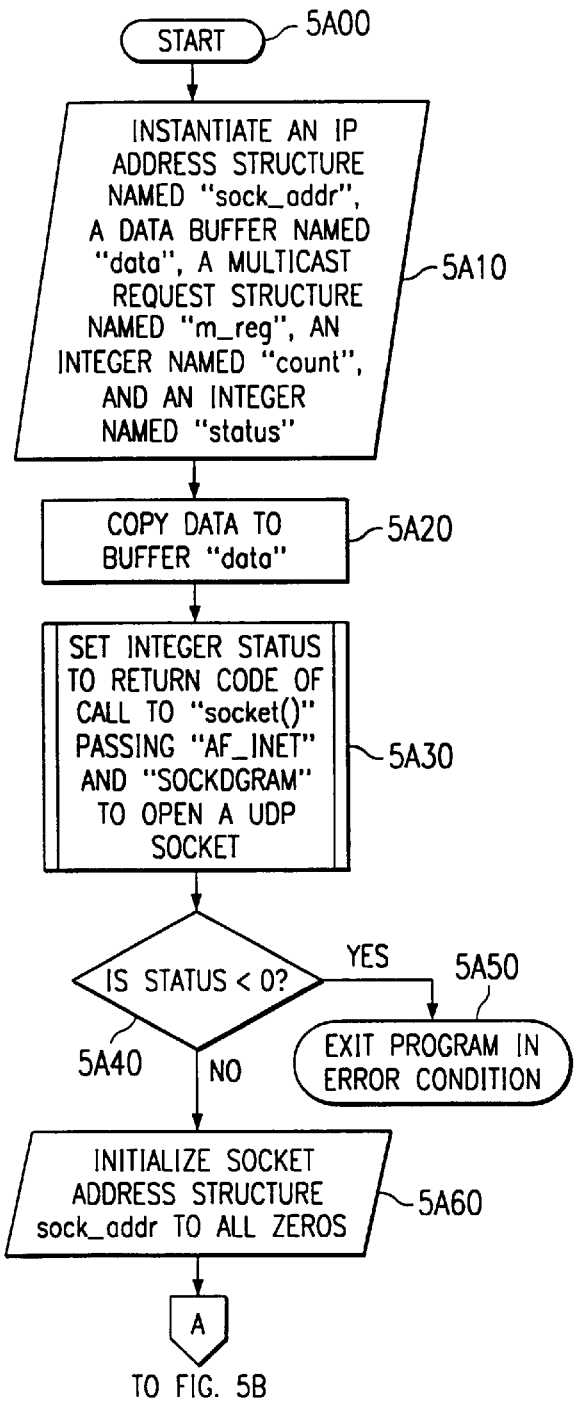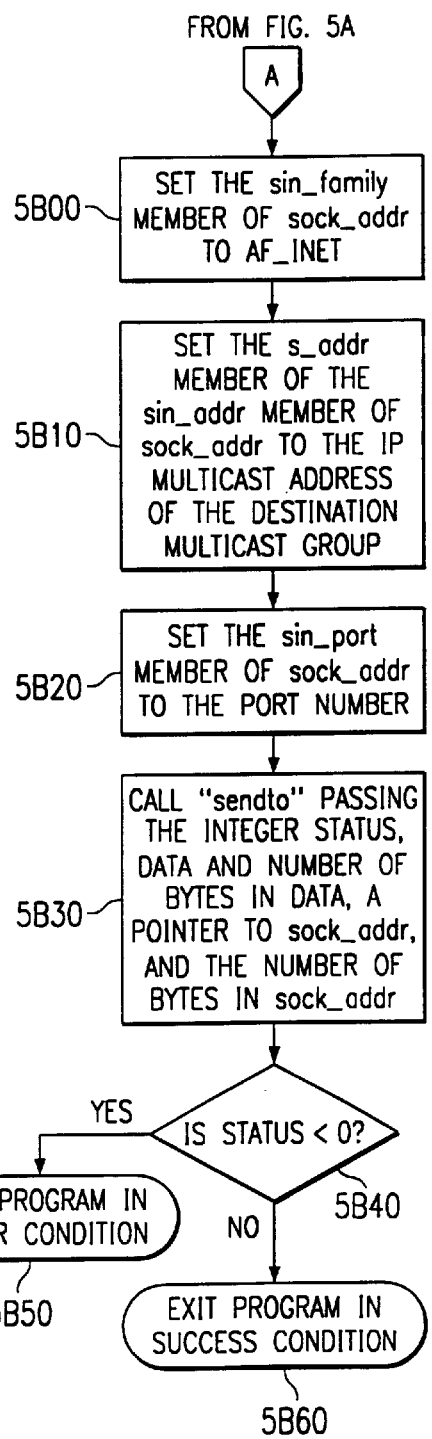
FIG. 5A
FIG. 5B

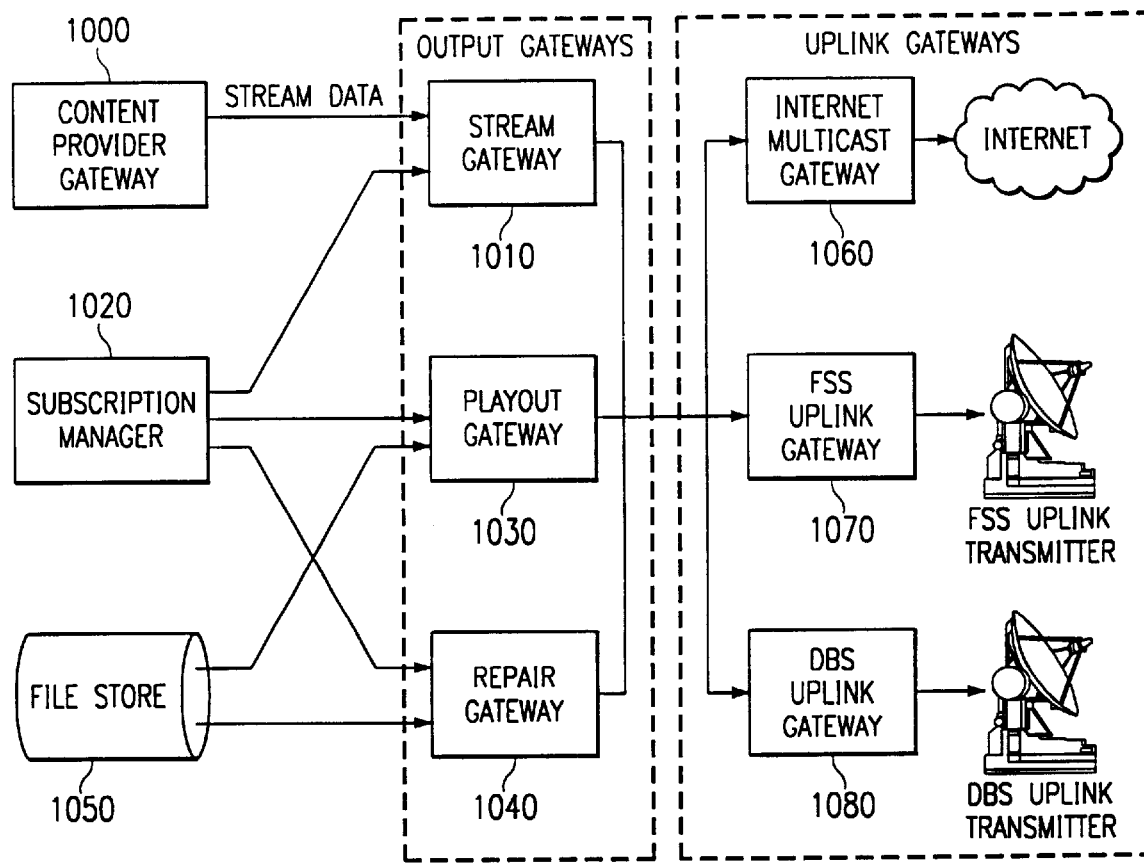
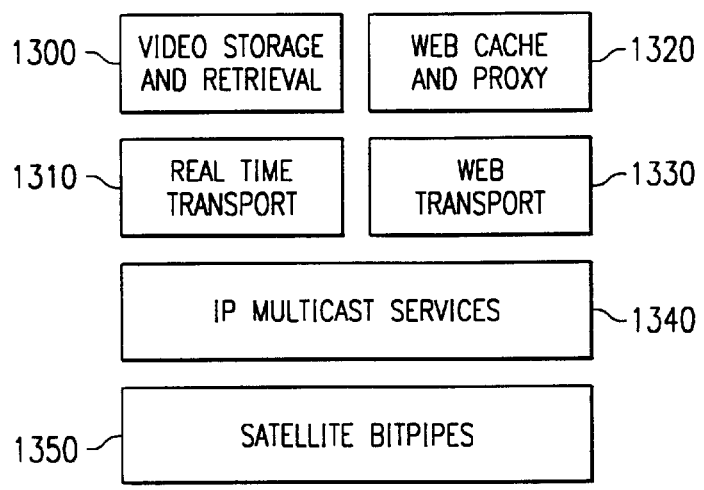

SYSTEM FOR SELECTIVELY ROUTING DATA VIA EITHER A NETWORK THAT SUPPORTS INTERNET PROTOCOL OR VIA SATELLITE TRANSMISSION NETWORK BASED ON SIZE OF THE DATA

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention generally relates to improvements in computer systems, and more specifically, to utilizing multicast satellite broadcast technology as a bridge between telephony operations and the Internet.

BACKGROUND OF THE INVENTION

Traditionally, data has been delivered to network-connected desktop personal computers either by broadcasting or unicasting, while the need for multicasting data has been unsatisfied. Broadcasting is a form of addressing wherein the destination address specifies all destinations; all destinations indiscriminately receive the data whether or not the data is needed by the destination computer. Where data is not needed at a particular network-connected personal computer, the transmission of the data is an inefficient use of resources. This can be particularly disabling to a network that does not have sufficient bandwidth capacity for all of the data traffic. Broadcasting is less efficient in direct relation to the proportion of users in the community of the broadcast that do not need the broadcast data.

In contrast, unicasting is a form of addressing where the destination address specifies a single destination. Unicasting eliminates the unnecessary transmission of data to destinations that have no need for the data, but is still inefficient because the data will be replicated on the network for each individual destination. For example, when data is transmitted to 20 personal computers connected to a server, 20 transmissions of the data will be made, each with a different individual destination address.

Where data needs to be transmitted to a limited set of all network-connected personal computers, transmission using broadcasting or unicasting falls short of efficient resource use. Multicasting offers more efficient resource use. Multicasting is a form of addressing wherein a source sends data to a server and the server sends one copy of the data to each of the destination computers. This form of addressing is particularly beneficial where the link between the source and the server has limited capacity or high cost because only one copy of the data that is intended for multiple recipients is transmitted to the server. Multicasting makes the most efficient use of an expensive link or a link that has insufficient capacity for transmission to multiple destinations by reducing the number of transmissions across the critical link to one, rather than requiring that multiple transmissions be made for each destination address.

One arena where multicasting is implemented is the Internet. Multimedia applications involve text, graphics, voice and video and hypertext operations. Multimedia applications typically require large amounts of data in comparison to traditional computer applications. The Internet has increasingly become the communication network of choice for the consumer marketplace. Multimedia applications exist on the Internet, but the throughput of the Internet limits the usefulness of multimedia applications because multimedia applications are highly interactive and require higher throughput than the Internet can provide. The limitations on bandwidth make the Internet more suitable and efficient for low bandwidth applications such email and smaller multimedia applications.

The Multicast backbone (MBONE) is a virtual network on top of the Internet which supports routing of Internet Protocol (IP) multicast packets, intended for multimedia transmission. MBONE enables public access to desktop video communications. However, the quality is poor, with only 3–5 frames per second instead of the 30 frames per second of commercial television. Therefore, transmission of multimedia data via the Internet is too slow, even using multicasting.

Two independent technologies have emerged that provide greater speed and throughput (Internet Protocol (IP) Multicast and Digital Video Broadcast) that together have the potential to provide for transmission of multimedia information over a network. IP Multicast is an important advance in IP networking that has been under development since the early 1990's but is only now receiving broad (and growing) practical industry backing through the commercial availability of network infrastructure elements.

An extension of standard IP, IP Multicast allows applications to send one copy of information to a group address, and have the information transmitted to each recipient of the group requiring receipt of the information. IP Multicast is more efficient than point-to-point unicast because the source need send only once, and more efficient than broadcast since only interested nodes are impacted by transmission of the information. IP Multicast thus scales well as the number of participant and collaborations expand, and it integrates well with other new IP protocols and services, such as Quality of Service requests to support real-time multimedia.

However, despite the advantages of IP Multicast, its terrestrial implementation may be slow because all routers between the sender and the receivers must be IP Multicast enabled. Even then, network bandwidth may be limited for some considerable time. The demand of consumers for digital satellite TV systems has driven the development of Direct Broadcast Satellite (DBS) systems that can broadcast directly to small, low cost receiver equipment. The standard likely to become dominant on a global basis is Digital Video Broadcast (DVB) which was developed by the European Broadcasting Union.

DVB specifies standards for the digital broadcast of video, sound and data across satellite (DVB-S), cable (DVB-C) and SMATV (DVB-CS) data link layers. DVB specifies common conformance standards at several levels including channel coding (Reed-Soloman forward error correction), transport layer (MPEG-2 Systems Transport bitstream) and elementary stream layers (MPEG-2 for video encoding and MPEG-1 for audio encoding). An elemental stream is a single, digitally coded component of a multimedia channel (e.g. a single coded video or audio stream). MPEG-2 elemental stream encoding thus provides good VHS quality video at 1.5–2 Megabits and studio production quality video at approx. 6–8 Megabits. MPEG-2 transport enables video, audio and data to be multiplexed onto the physical channel of choice, with DVB is specifying the remaining system elements for each transport media being used. For example with satellite communications DVB specifies the physical channel (single 38 Megabits satellite transponder), signal/noise ratio and channel coding (e.g. 2bit/symbol QPSK modulation).

Satellite communications offer sufficient bandwidth for remote multimedia applications, however satellite connections for the typical computer user are practically non-existent and expensive and do not allow for use of economical open client/server technologies. A client/server architecture is an economical, proven and common form of distributed system wherein software is split between server tasks and client tasks. A client sends requests to a server, according to some protocol, asking for information or action, and the server responds. There may be either one centralized server or several distributed ones. This model allows clients and servers to be placed independently on nodes in a network, possibly on different hardware and operating systems appropriate to their function, e.g. fast server with an inexpensive client.

There is a rapidly increasing market demand for network based application services that enable the efficient operation of computer applications which are one-to-many in their information flow and which require high network bandwidth. Major advances in digital transmission, encoding and inter-networking technology and the advent of direct broadcast satellite have matched this. This market need combined with the emerging technological capability has prompted development in accordance with a preferred embodiment. The engineering challenge was to develop a system solution that makes optimum use of emerging digital broadcast technology such as DVB/MPEG while seamilessly integrating into an emerging IP Multicast standard for data technology. With such an emergent service, the architecture of any solution must also be scaleable from an early system for deployment as part of an individual customer solution, through to a multi-customer service platform capable of simultaneously supporting multiple large business customers.

There are two basic models for delivery of information to endusers: (a) information can be requested by the end user of a central source (pull model), or (b) information can be sent from the central source to the end user (push model). Established LAN and WAN technologies, applications and services are very efficient at supporting the pull model of information flow. However, as advanced information technology becomes critical to organizations, there is a rapidly increasing market demand for information technology and network services that efficiently enable push oriented, one-to-many information flow.

In addition, even when data compression is used, the increasingly multimedia nature of applications requires high bandwidth support of a one-to-many information flow. And even many non-multimedia applications require high bandwidth for the timely transfer of large files of information. The concept of multicasting was originally developed to provide application and inter-network services in response to a demand for high bandwidth one-to-many services. Multicasting utilizes the natural broadcast capabilities of a satellite infrastructure, while smoothly integrating with existing and emerging terrestrial data network services and pull oriented application services.

A solution to the problems of transmitting multimedia data and supporting call processing across the economical Internet while utilizing the high throughput of orbital satellites would integrate the Internet and satellites into a hybrid telecommunications system using multicasting client/server technologies.

The present invention relates to the integration of satellite transmission facilities with the Internet and telephony systems, and more specifically, to a system, method and article of manufacture for using the Internet and satellite transmissions as the communication backbone of a distributed multicasting client/server communication system architecture. This architecture allows a user to transmit data to a central site and then transmit the information through a satellite link to numerous destination ground stations that have direct broadcast satellite (DBS). The satellite receiving services are old; however, multicasting data through a satellite link to local receiving stations that distribute the data by unicasting to numerous individual destinations on a standard, non-proprietary software transport mechanism, such as the internet, is new.

SUMMARY OF THE INVENTION

The foregoing problems are overcome in an illustrative embodiment of the invention in a hybrid network computing environment wherein a high bandwidth data is transmitted via satellite links to individual. computers. The solution is to use multicasting and satellite links in the transmission route where speed and performance and cost are most critical, up to the point of local distribution via a local area network or the Internet. The data is transmitted from the source to a receiving facility at the site of final distribution via a satellite, which greatly improves performance in comparison to transmission via the Internet or the telephone system. The cost of this transmission is reduced and the performance is increased by multicasting the transmission. When the multicast information is received at the receiving facility, the data is sent to each of the individual destinations using a standard, non-proprietary mechanism such as the Internet. Scalability and economy are improved through the use of the industry standard non-proprietary software transport mechanism (IP) at the receiving facility.

In a further aspect of a preferred embodiment of the invention, the receiving facility will examine the status of the transmission and if the transmission was unsuccessful, the receiving facility will transmit information indicating an error status to the source, and the source will respond by transmitting the multicast data again, thus providing reliable data delivery.

In still another aspect of the invention, the gateway server is configured to route any messages larger than a certain size to a satellite broadcast facility if the messages are traveling more than 1000 miles.

In yet another aspect of the invention, a production token ring network is in communication with the gateway server. The production token ring network is optionally coupled to an interior packet filter configured to accept only communications originating from a predetermined set of addresses.

In an additional aspect of the invention, video transmissions are encoded according to the MPEG-2 standard IS-13818.

BRIEF DESCRIPTION OF THE DRAWINGS

The above and further advantages of the invention may be better understood by referring to the following description, in conjunction with the accompanying drawings, wherein:

FIGS. 5A through 5B describe a flow chart of a computer software program that will transmit IP multicast data using sockets in accordance with a preferred embodiment;

FIG. 10 illustrates the output gateways communicating with the uplink facility of the source in accordance with a preferred embodiment;

FIGS. 13 illustrates the layered system architecture in accordance with a preferred embodiment;

DETAILED DESCRIPTION

Figure 1:
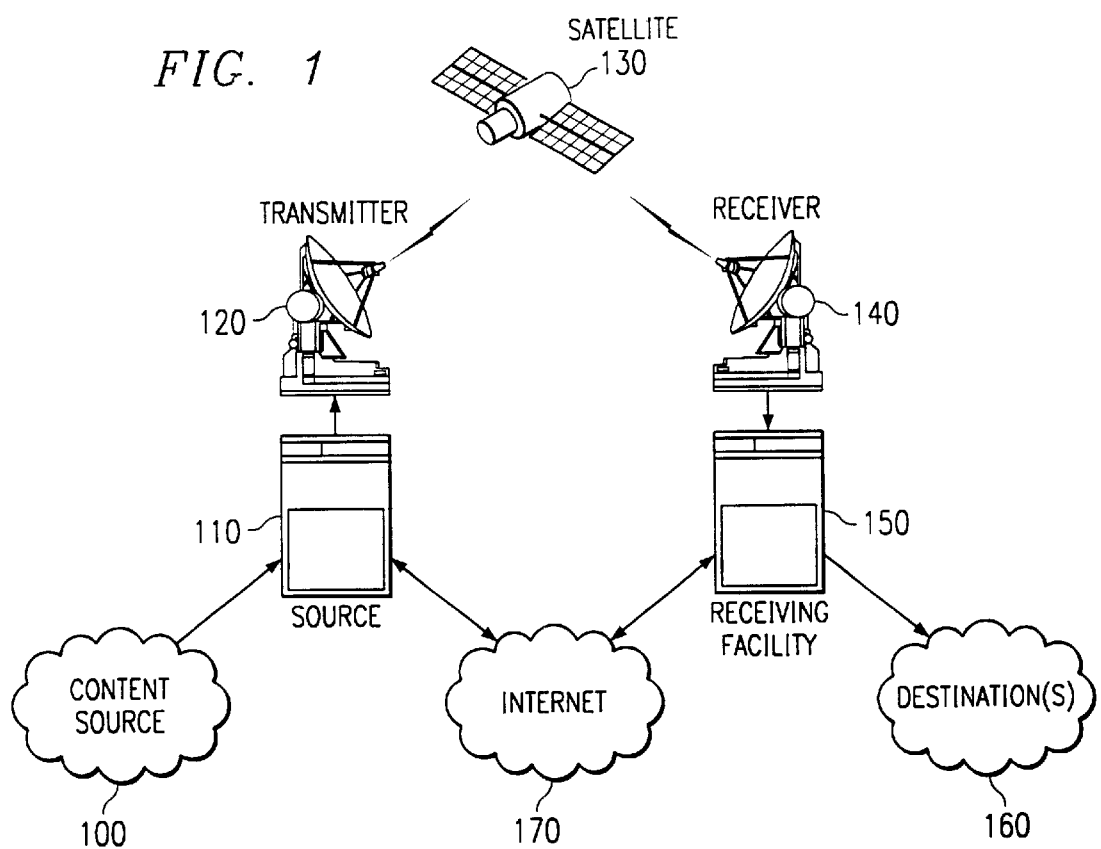
FIG. 1 illustrates the general topology of a source and a receiving facility communicating via a network in accordance with a preferred embodiment.

To assist in clarifying the technical subject matter of this application, a few terms are defined at the outset.

TABLE 1

Universal Terms

| Definition of terms | |
| --- | --- |
| Bandwidth | Measure of the amount of data passing through a network at a given time. |
| Bridge | A network bridge works on layer 2 of the OSI model. Thus, bridges are protocol independent. Network traffic is typically forwarded to correct bridge interfaces based on MAC address. |
| Distance Vector Multicast Routing Protocol (DVMRP) | DVMRP is the original IP Multicast routing protocol. It was designed to run over both multicast capable LANs (like Ethernet) as well as through non-multicast capable routers. In this case, the IP Multicast packets are "tunneled" through the routers as unicast packets. This replicates the packets and has an effect on performance but has provided an intermediate solution for IP Multicast routing on the Internet while router vendors decide to support native IP Multicast routing. |

TABLE 1-continued

Universal Terms

| Definition of terms | |
| --- | --- |
| Duplex Communications | Two-way point to point communications. |
| internet | A group of networks that are interconnected so that they appear to be one continuous network, and can be addressed seamlessly at the Network Layer Three of the OSI model. Also, the "Internet" (capital I) is the name given to the global network also known as the "World Wide Web". |
| Internet Group Management Protocol (IGMP) | IGMP was primarily designed for hosts on multi-access networks to inform locally attached routers of their group membership information. This is performed by hosts multicasting IGMP Host Membership Reports. Multicast routers listen for these messages and then can exchange group membership information with other multicast routers. This allows distribution trees to be formed to deliver multicast datagrams. The original version of IGMP was defined in RFC 1112. |
| Internet Protocols (IP) | An unreliable, connectionless datagram delivery service that allows networks to interact in a coherent manner and to pass data across multiple networks. The TCP/IP standard protocol defines the IP datagram as the unit of information passed across an Internet and provides the basis for connectionless packet delivery service. IP includes the ICMP control and error message protocol as an integral part. It provides the functional equivalent of ISO OSI Network Services. |
| Intranet | A subset of a larger network. An interconnected set of networks within a particular domain, such as a corporation, using IP or proprietary protocols to communicate between networks. |
| IP Address | The 32-bit address assigned to hosts that want to participate in a TCP/IP Internet. |
| IP datagram | The basic unit of information passed across a TCP/IP Internet. |
| Local Area Network (LAN) | A network physically confined to a small region of space, typically within a single building; contrasting with a Wide Area Network (WAN), which may be countrywide or even worldwide. |
| Multicast | IP-Multicast is the class-D addressing scheme in IP developed by Steve Deering at Xerox PARC. A set of Internet Protocols designed to allow point to multipoint distribution of data. |
| Multicast Address | An address, within a range of IP addresses, that identifies the data as a multicast session. |
| Multimedia | Digital information intended to interface with the human senses. |

TABLE 1-continued

Universal Terms

| Definition of terms | |
|---|---|
| Protocol Independent Multicast (PIM) | PIM was designed to take advantage of two existing multicast routing protocols, DVMRP and CBT. It exhibits the behavior of a protocol in a region of dense group membership flooding multicast packets using Reverse Path Multicasting, while also taking advantage of the work done for sparse group membership in Core Based Trees. Hence, the protocol has two modes, dense and sparse. |
| Protocol Independent Multicast-- Sparse Mode (PIM-SM) | The Protocol Independent -Multicast--Sparse Mode (PIM-SM) architecture:<br>● maintains the traditional IP multicast service model of receiver-initiated membership;<br>● uses explicit joins that propagate hop-by-hop from members' directly connected routers toward the distribution tree.<br>● builds a shared multicast distribution tree centered at a Rendezvous Point, and then builds source-specific trees for those sources whose data traffic warrants it.<br>● is not dependent on a specific unicast routing protocol;<br>● uses soft-state mechanisms to adapt to underlying network conditions and group dynamics. The robustness, flexibility, and scaling properties of this architecture make it well suited to large heterogeneous internetworks. |
| Routers | An OSI network layer (Layer 3) device that can decide which of several paths network traffic will follow based on some optimality metric. Routers forward packets from one network to another, based on network layer information. |
| Simplex Communications | One-way communications. In a simplex environment, there is only a transmit or receive path available between two network components. |
| The OSI model | The ISO seven-layer model attempts to provide a way of partitioning any computer network into independent modules from the lowest (physical) layer to the highest (application) layer. Many different specifications exist at each of these layers. |
| Tunneling | Encapsulation of network traffic at one interface for decapsulation by a peer interface. Also used to establish virtual connecting interfaces between subnets. |
| Unicast | Single destination addressing. |

TABLE 2

Multicast Network Terms

| Definition of terms | |
|---|---|
| Administratively scoped addresses | A range of Multicast addresses which are limited to intranet or other defined domains and which are not distributed to the general internet. |
| Application Clients | Network devices that request and receive multicast data from application servers. |
| Application Server | The server which originates the multicast distribution of a multicast application. |
| Boundary Routers | Routers which interface between the satellite insertion point and downstream clients. This is the first router the received multicast signal is distributed to. |
| Downstream Clients | Application Clients with a boundary router and possibly other routers, between them and the insertion point. |
| Downstream Routers | Routers located downstream of the boundary router. |
| GRE Tunneling | Generic Routing Encapsulation Tunneling protocol developed by Cisco that can encapsulate a wide variety of protocol packet types inside IP tunnels, creating a virtual point-to-point link to Cisco routers at remote points over an IP internet. By connecting multiprotocol subnetworks in a single-protocol backbone environment, IP tunneling using GRE allows network expansion across a single-protocol backbone environment. |
| Infolink | MCI's Intranet, based on IP |
| Insertion Point | The point where a satellite receiver is attached to a LAN or other network component. |
| Insertion Point Clients | Application Clients that are directly connected to the insertion point LAN. |
| IPTV | A multicast application from Precept. |
| MMSE Operations LAN Segment | MultiMedia Services Engineering A LAN Segment which interfaces between the application server, the downstream clients and the Operations Router. |
| Operations Router | Interface router between Operations LAN Segment, Uplink LAN Segment and terrestrial network. |
| Satellite Transmission Path | The combined terrestrial and space segment path from the Uplink LAN to the receiving antenna. This path uses the dedicated telephony network route to the satellite uplink site, where the signal is inserted into the uplink signal for the appropriate satellite. The satellite broadcasts the signal to a 'footprint' that covers the Continental US with 'spot beams' aimed at Hawaii and Alaska. (spot beams optional) |
| Simplex Satellite Multicast | One-way communication over a satellite of a multicast datastream. |
| Uplink LAN | LAN connected to the Operations router. This LAN distributes multicast traffic to the satellite. |

TABLE 3

Multicast Applications Terms

| Definition of terms | |
|---|---|
| CPU | The Processor or chip in a computer that carries out all the instructions of a program and controls all the other parts of a computer. |
| Decoder | A device for decompressing a compressed incoming bitstream, then splitting it into its audio and video components, and converting the data into analog signals for playback. |
| Encoder | A device that records, digitizes, and compresses analog audio and video content. |
| Frame Rate | The number of complete single video pictures that are streamed and measured on a per second basis. The acronym usually used is displayed as (fps). |
| Functional Testing | In System Testing, testing which attempts to find a discrepancy between a program and its specification. |
| Graphical User Interface | Graphical User Interface; an Interactive screen display where the user can move a Mouse to point the 'arrow' cursor at symbols (icons or buttons) that represent data or instructions to the machine, reducing the need for keyboard typing |
| I/O Operation | A task on a computer that reads and/or writes data to an external hardware device such as a CD-ROM, floppy disk, hard drive. |
| MPEG1 | An International Standards Organization (ISO) standards that addresses the methods for encoding video and audio at bandwidth rates of approximately 1.5 Mbps (suitable for CD-ROM). |
| Parallel Processing | The ability to achieve multiple tasks under a single PC configured with a single operating system simultaneously. |
| RAM | Random Access Memory. A device, often in the form of a chip (or set of chips) that stores Data and programs for immediate use by a CPU. The contents of RAM memory are normally lost when the machine is switched off. |
| Regression Testing | In System Testing, tests used to verify each new version of the system whenever that system is modified. It verifies the modification and investigates the impact of changes on the existing functions. |
| Streaming | A bit sequence of compressed digital video. |
| Video Resolution | The number of pixels per unit area with the greater the number of pixels represent the higher the resolution. |

Overview

FIG. 1 illustrates the general topology of a source and a receiving facility communicating via a network in accordance with a preferred embodiment. The flow of data starts at a content source 100. The content may be in any one of a number of digital forms, including data files and real-time data streams. Data in every form and format is enabling. The data streams may be audio, or video originating from local sources or international sources. The content is transmitted to a source 110 via any one of a number of methods, including network, Internet, Intranet, or radio broadcast. The data is forwarded to a satellite transmitter 120, received and forwarded to an orbiting satellite 130, received by a satellite receiver 140 and forwarded to a receiving facility 150 and transmitted to one or a plurality of destinations 160. In the alternative, the path of transmission between the source 110 and the receiving facility 150 may be via the Internet 170. The source 110 includes a content provider facility and a broadcast operation center. The receiving facility 150 includes a down-link gateway, a local program menu database and an application services facility. The flow of data via the satellite links 120, 130, 140 is unidirectional, from the source 110 to the receiving facility 150.

The flow of data via the Internet 170 is unidirectional from the source 110 to the receiving facility 150. However, data indicating the success or lack of success of all content transmissions is forwarded to the source 110 via the Internet or public switched telephone network or ISDN at data transmission speeds ranging from 28.8 kilobytes per second to 1.5 megabytes per second. 170.

Figure 2:
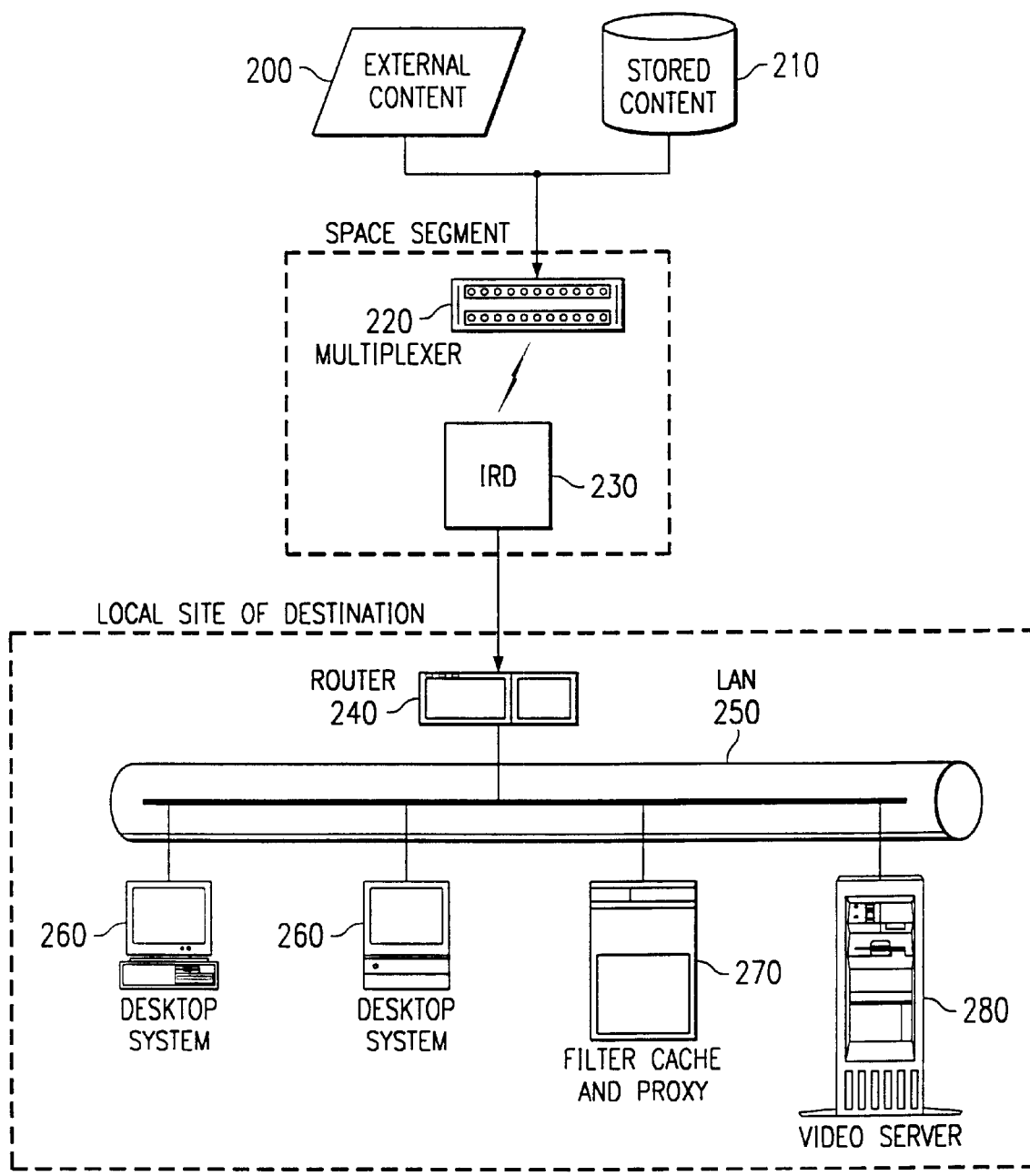
FIG. 2 illustrates the physical system decomposition in accordance with a preferred embodiment.

FIG. 2 illustrates the physical system decomposition in accordance with a preferred embodiment. Data is introduced into the system either directly from external content providers 200 or from stored content 210 that resides on mass storage in the system. In the orbital space segment, the data is multiplexed by a multiplexer (MUX) 220, transmitted and received by an integrated receiver device (IRD) 230 at the local site of the destination(s). At the local destination site, the data is routed by a network router 240 to a local area network (LAN) 250 and distributed via multicasting to any number of desktop systems 260, caching servers 270 and video servers 280.

IP Multicasting

Broadcasting data to various individual destinations, each of which have satellite receiving facilities, via a satellite has been done before. However, it is new to multicast data using-IP directly to various receiving facilities, which in turn transmit the data to the destinations.

Figure 3:
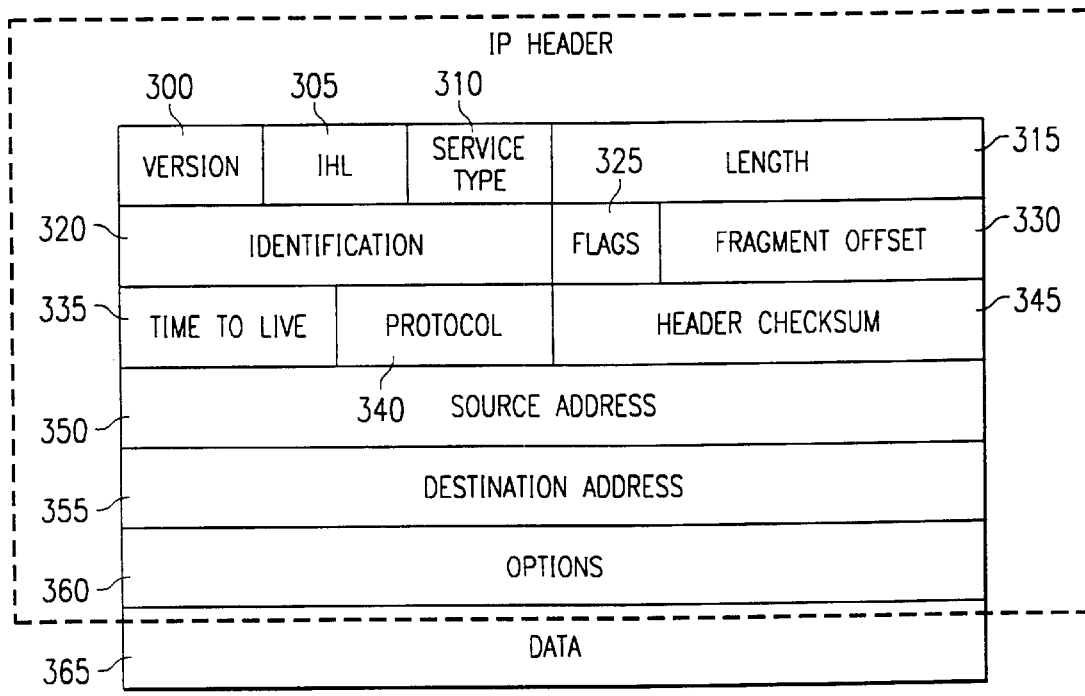
FIG. 3 illustrates an IP datagram in accordance with a preferred embodiment.

FIG. 3 illustrates an IP datagram in accordance with a preferred embodiment. At the IP level, data is sent in datagram packets, a self-contained, independent entity of data carrying sufficient information to be routed from the source to the destination without reliance on earlier exchanges between this source, destination and the transporting network. Datagrams are defined by Internet Engineering Task Force RFC 922 as illustrated in FIG. 3. The version number 300 indicates the format of the Internet header. The Internet Header Length (IHL) 305 indicates the length of the Internet header in 32-bit words. The Service Type 310 indicates the level of service that should be given by routers and networks. The Length 315 indicates the total length of the datagram in octets. The Identification 320 indicates where this datagram fits in with a scheme of assembling it with other datagrams at the destination. Flags 325 indicate whether the datagram may be fragmented into multiple datagrams. The Fragment Offset 330 indicates where in the datagram this fragment belongs. The Time to Live 335 indicates how many times this datagram may be passed from one Internet link to another before it will be discarded. The Protocol 340 indicates which Internet protocol this datagram complies with, which is Internet Group Management Protocol (IGMP) defined by IETF RFCs 1112 Appendix I and 1122 section 3.2.3 in accordance with a preferred embodiment. IGMP is used by IP multicast routers to locate and identify multicast group members on their directly attached subnets. Multicasting can be accomplished alternatively by subnet broadcast in accordance with IEFT RFC 922 or UDP flooding. IGMP is supported by Protocol-Independent Multicast—Dense Mode (PIM-DM) routing protocol in accordance with a preferred embodiment. IP multicasting can be alternatively supported by routing protocols such as the Distance Vector Multicast Routing Protocol (DVMRP), Multicast Open Shortest Path First (MOSPF), Core Based Trees (CBT, Protocol-Independent Multicast—Sparse Mode (PIM-SM), Real-Time Streaming Protocol (RTSP) Real-Time Transport Protocol (RTP) or Reservation Protocol (RSVP). The Header Checksum 345 is a checksum of the header fields only. The Source Address 350 is the IP address of the source of each datagram. IP addresses are 32 bits long. The Destination Address 355 indicates the IP address of the destination. Destination addresses confrom to five classes, A, B, C, D, and E. Class D addresses are compliant IGMP multicast addresses, wherein the lower 28 bits identify the multicast group to which a packet is destined, and the four high-order bits are set to "1110." Each unique multicast address indicates a specific multicast group of hosts and each group consists of zero or more hosts.

Each multicast router may belong to any number of multicast groups. A multicast address is assigned to a set of receivers defining a multicast group. Senders use the multicast address as the destination IP address of a packet that is to be transmitted to all group members. Class D addresses range from 224.0.0.0 to 239.255.255.255. The Options 360 are a variable number of bit flags that indicate a number of options. Finally, the Data 365 is placed at the end of a datagram packet.

Data larger than some arbitrary size is divided into multiple datagrams, all of which are transmitted separately and independently. A sequence of IP packets sent from a source to a destination could travel over different paths. The original data set is reconstructed at the destination by assembling the data in the individual datagram packets. A datagram consists of two major portions: The IP header and the Data 365. The IP header is appended before the data.

Figure 4:
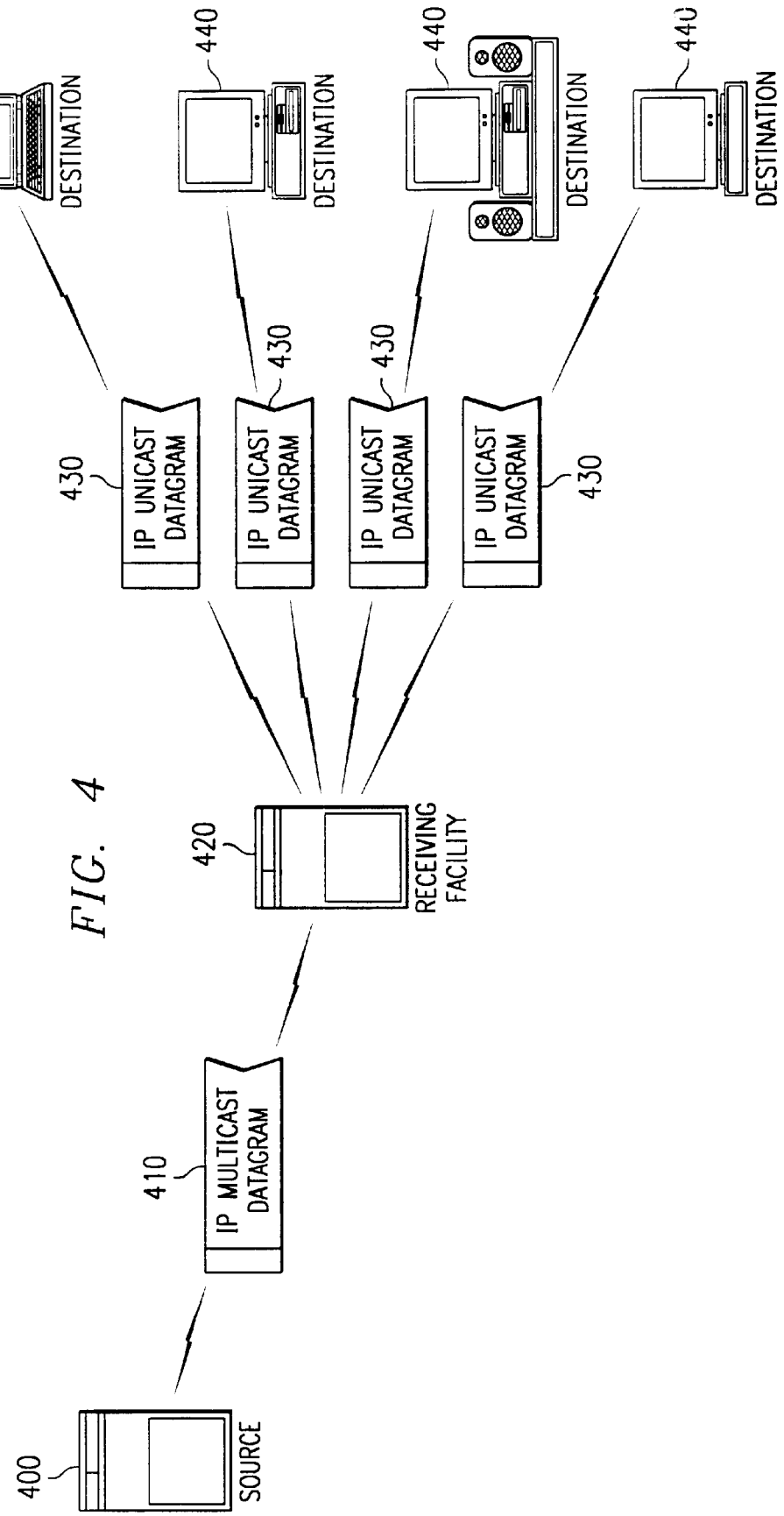
FIG. 4 illustrates the path of an IP multicast datagram over a network in accordance with a preferred embodiment.

FIG. 4 illustrates the path of an IP multicast datagram over a network in accordance with a preferred embodiment. The source computer 400 initiates transmission of an IP multicast datagram 410 to a IP multicast router 420. The IP multicast datagram 410 is identified as an IP multicast datagram by the class D destination address. The IP multicast router 420 receives the IP multicast datagram 410, and transmits the IP multicast datagram 410 as an IP unicast datagram 430 to each of the individual destinations 440.

To receive multicast packets, an IP multicast router must first request that it join a particular multicast group. This is done using a call to setsockopt ( ) in accordance with a preferred embodiment as presented below:

```
struct mreq₁₃ ip
{
    struct in_addr imr_multiaddr; // multicast group to
        join
    struct in_addr imr_interface; // interface to join
}
struct mreq_ip m_req;
setsockopt(sock,
    IP_IPPROTO,
    IP_MEMBERSHIP_ADD, &m_req,sizeof(m_req));
```

After the IP multicast router has joined a multicast group, IP multicast data from an IP multicast source will be received by an IP multicast router.

Boundary Router in Accordance with a Preferred Embodiment

| Cisco 2509 | Running 11.0.11 | |
|---|---|---|
| Global Setup: | IP Multicast Routing | |
| Protocol Setup: | Static Route Distribution | 166.34.120.128 |
| | OSPF | |
| Interface Setup: | Insertion Point LAN | 166.34.120.33-PIM |
| | Segment | 166.34.120.255-PIM |
| | Downstream LAN | 166.34.120.225-NO PIM |
| | Segment | |
| | GRE Tunnel | |

The source code for a downstream router in accordance with a preferred embodiment is provided below as an aid in teaching one of ordinary skill in the art to make and use the invention.

```
version 11.0
service udp-small-servers
service tcp-small-servers
!
hostname 2509A
!
enable password sky
!
ip multicast-routing
ip dvrmp route-limit 7000
interface Tunnel0
ip unnumbered Serial0
tunnel source 166.34.120.225
tunnel destination 166.35.252.52
!
interface Ethernet0
ip address 166.34.120.33 255.255.255.224
ip pim dense-mode
!
interface Serial0
ip address 166.34.120.225 255.255.255.224
ip pim dense-mode
bandwidth 2000
no cdp enable
!
interface Serial1
no ip address
shutdown
!
router ospf 200
redistribute static subnets
network 166.34.0.0 0.0.255.255 area 0.0.0.0
!
ip domain-name rch.mci.com
ip name-server 166.35.191.120
ip classless
ip route 0.0.0.0 0.0.0.0 166.34.120.226
ip route 166.34.120.128 255.255.255.224 Tunnel0
ip ospf name-lookup ip mroute 166.34.120.128
    255.255.255.224 166.34.120.32
no logging console
access-list 100 permit icmp any any
access-list 100 deny ip any host 224.0.0.5
access-list 100 permit ip host 166.34.120.226 any
!
!
line con 0
password sky
line 1 8
transport input all
``` line aux 0
transport input all
line vty 0 1
password sky
login
length 18
line vty 2 4
password sky
login
!
ntp source Serial0
end

Downstream Router in Accordance with a Preferred Embodiment

| Cisco 2509 | Running 11.1.6 | |
|---|---|---|
| Global Setup: | IP Multicast Routing | |
| Protocol Setup: | OSPF | |
| Interface Setup: | Upstream LAN Segment | 166.34.120.226-PIM |
| | Downstream LAN Segment | 166.34.119.162-PIM |

The source code for a downstream router in accordance with a preferred embodiment is provided below as an aid in teaching one of ordinary skill in the art to make and use the invention.

```
version 11.1
service udp-small-servers
service tcp-small-servers
!
hostname 2509B
!
enable password sky
!
ip multicast-routing
ip dvmrp route-limit 7000
!
interface Ethernet0
ip address 166.34.119.162 255.255.255.240
ip pim dense-mode
!
interface Serial0
ip address 166.34.120.226 255.255.255.224
ip pim dense-mode
bandwidth 2000
clockrate 2000000
!
interface Serial1
no ip address
bandwidth 1500
shutdown
clockrate 2000000
!
router ospf 200
network 166.34.0.0 0.0.255.255 area 0
!
ip domain-name rch.mci.com
ip name-server 166.35.191.120
ip classless
no logging console
access-list 100 permit icmp any any
!
line con 0
password sky
line 1 8
line aux 0
line vty 0
password sky
login
length 18
line vty 1 4
password sky
login
!
ntp clock-period 17180064
ntp source Ethernet0
end
```

FIGS. 5A through 5B comprise detailed logic presented as a flow chart of a computer software program that transmits IP multicast data using sockets in accordance with a preferred embodiment. The sender program on the source computer is started 5A00. An IP address structure labeled "sock_addr", a data buffer named "data", a multicast request structure name "m_req", an integer name "count", and an integer named "status" are instantiated 5A10. Data is copied to a buffer named "data" 5A20. Status is set to the return code of a call to "socket( )" which passes "AF_INET" and "SOCKDGRAM" to open a UDP socket 5A30. If status is less than numeric 0 5A40 indicating failure on the socket( ) call, the program is exited in an error condition 5A50. Otherwise, socket address structure sock-addr is initialized to all numeric zeros 5A60.

The sin_family member of sock_addr is set to AF_INET 5B00. The s_addr member of the sin_addr member of sock_addr is set to the IP multicast address of the destination multicast group 5B10. The sin_port member of sock_addr is set to the port number 5B20. The multicast transmission of data is attempted by invoking "sendto( )" and passing as parameters the integer status, data and number of bytes in data, a pointer to sock_addr, and the number of bytes in sock_addr and setting the integer status to the return code of the call to sendto( ) 5B30. If status is less than numeric 0 5B40 indicating failure on the sendto( ) call, the program is exited in an error condition 5B50. Otherwise, the program is exited in a success condition 5B60.

Figure 6A:
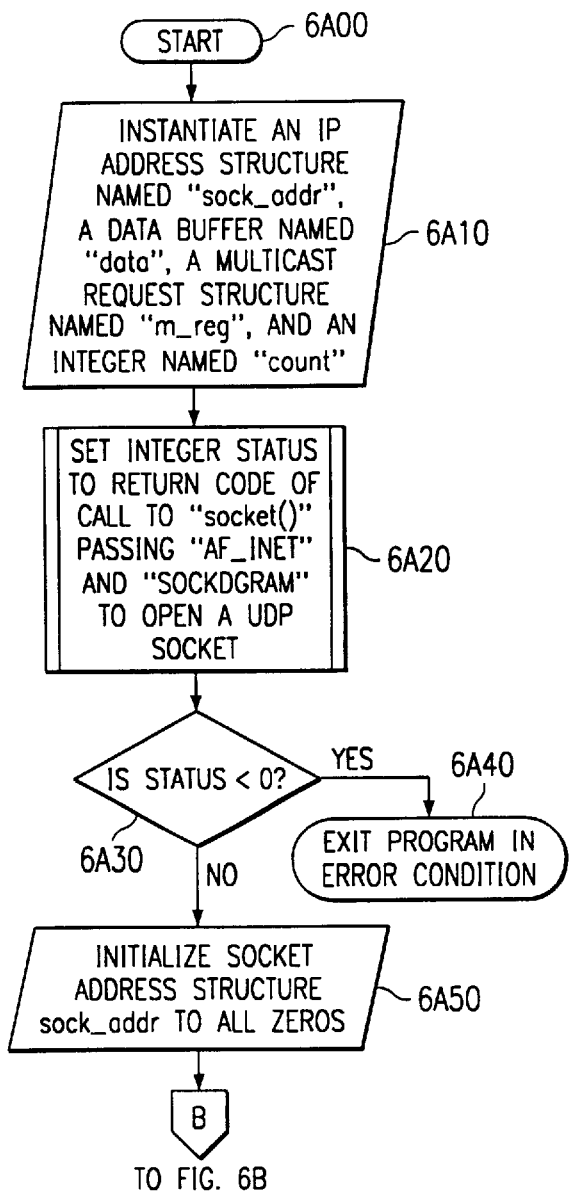
FIGS. 6A through 6B describe a flow chart of a computer software program that will receive IP multicast data using sockets in accordance with a preferred embodiment.
Figure 6B:
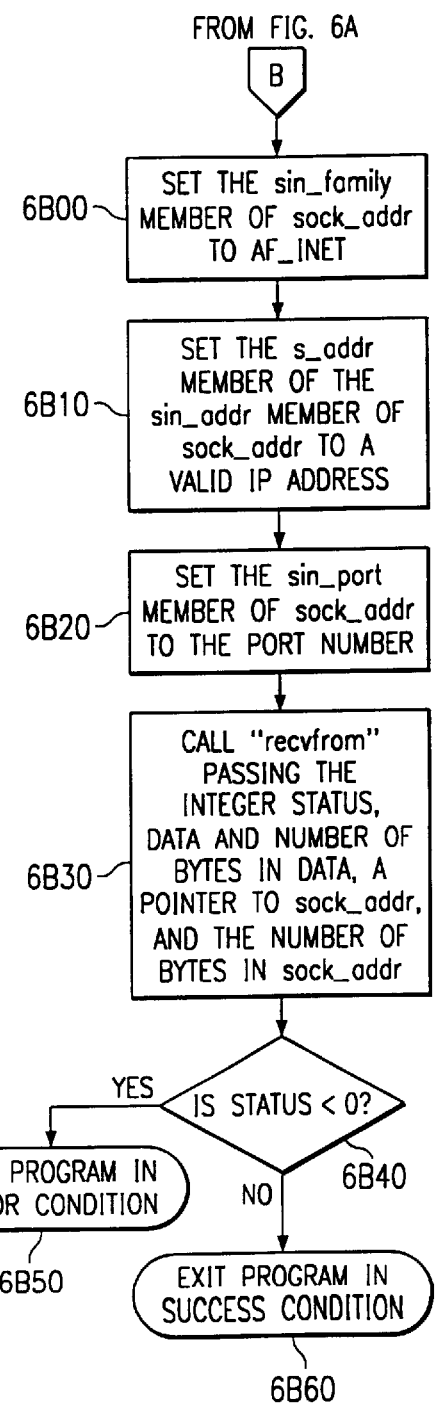

FIGS. 6A through 6B present detailed logic in a flow chart of a computer software program that receives IP multicast data using sockets in accordance with a preferred embodiment. The receiver program on the multicast router is labeled 6A00. An IP address structure named "sock_addr", a data buffer named "data", a multicast request structure name "m_req", and an integer named "count" are instantiated 6A10. Status is set to the return code of a call to "socket( )" which passes "AF_INET" and "SOCKDGRAM" to open a UDP socket 6A20. If status is less than numeric 0 6A30 indicating failure on the socket( ) call, the program is exited in an error condition 6A40. Otherwise, socket address structure sock_addr is initialized to all numeric zeros 6A50.

The sin_family member of sock_addr is set to AF_INET 6B00. The s_addr member of the sin_addr member of sock_addr is set a valid IP address 6B10. The sin_port member of sock_addr is set to the port number 6B20. The multicast transmission of data is attempted by invoking "recvfrom( )" and passing as parameters the integer status, data and number of bytes in data, a pointer to sock_addr, and the number of bytes in sock_addr and setting the integer status to the return code of the call to sendto( ) 6B30. If status is less than numeric 0 6B40 indicating failure on the sendto( ) call, the program is exited in an error condition 6B50. Otherwise, the program is exited in a success condition 6B60.

Multicasting utilizes tunneling to connect islands of multicast routers separated by links which do not support IP multicasting. In tunneling, an entire datagram, including the IP header, is encapsulated in another IP datagram, which has a destination address of the network router that deencapsulates the tunneled IP datagram. When the datagram arrives at the destination router machine, the datagram is deencapsulated by stripping off the IP header, leaving the data, which is the original datagram.

The router then forwards the datagram to all members of the multicast group.

Topologies

Figure 7:
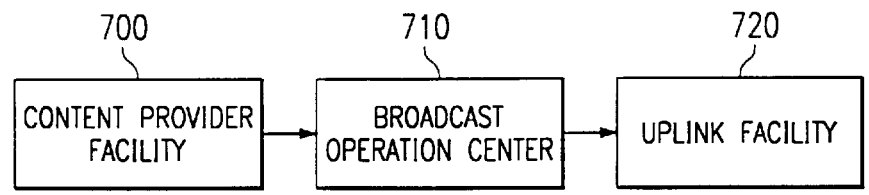
FIG. 7 illustrates the general topology of a source in accordance with a preferred embodiment.

FIG. 7 illustrates the general topology of a source in accordance with a preferred embodiment. A source includes three major functions. The content provider facility 700, the broadcast operation center 710, and the uplink facilities 720. Data generated at the content provider facility 700, is transmitted to the broadcast operation center 710, and is transmitted to the uplink facility 720.

Figure 8:
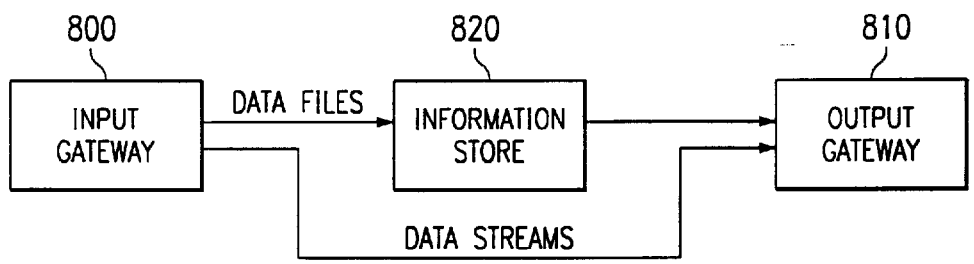
FIG. 8 illustrates the general topology of a broadcast operation center in accordance with a preferred embodiment.

FIG. 8 illustrates the general topology of a broadcast operation center in accordance with a preferred embodiment. Data enters the broadcast operation center through the input gateways 800 which includes a file gateway, a schedule gateway and a stream gateway. Data streams are forwarded to the output gateways 810 which includes a repair server, a playout server, and shares the stream gateway with the input gateway. The stream gateway is shared by the input gateways 800 and the output gateways 810 to accommodate the urgent transmission requirements of stream data. Data files are transmitted to the information store 820, and forwarded to the output gateways 810.

Figure 9:
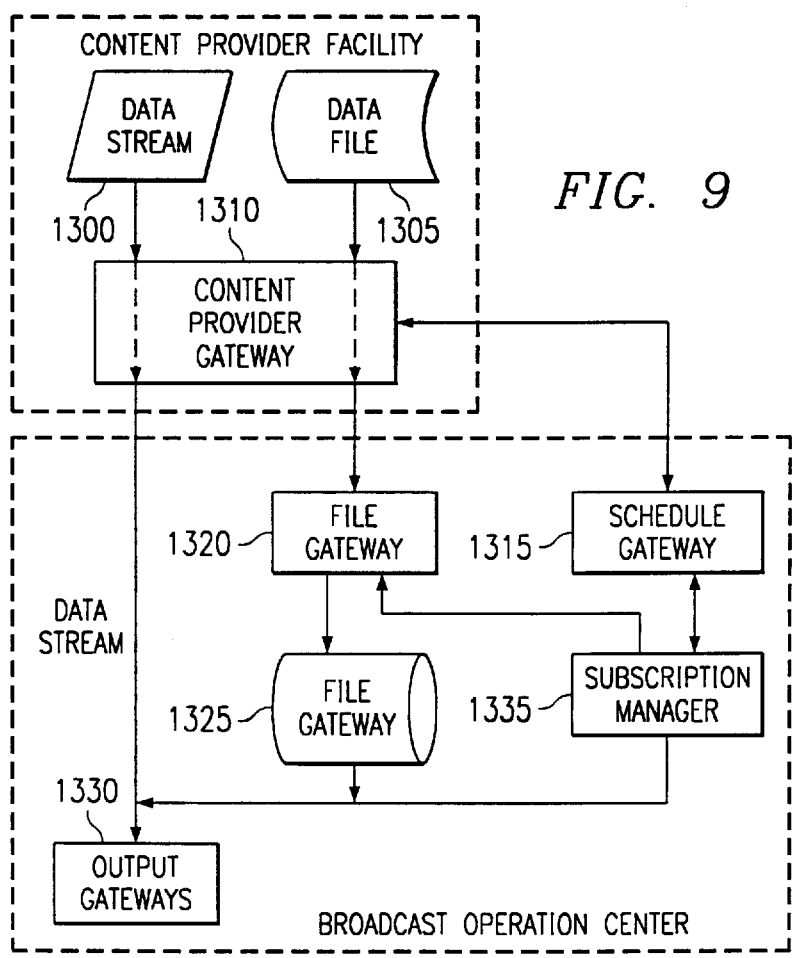
FIG. 9 illustrates the topology of a content provider facility and a broadcasting operation center including an input gateway, an information store and output gateways in accordance with a preferred embodiment.

FIG. 9 illustrates the topology of a content provider facility and a broadcasting operation center including an input gateway, an information store and output gateways in accordance with a preferred embodiment. Data streams 900 and data files 905 are received from external sources by the content provider gateway 910. Data streams 900 are assumed to be RTP/UDP unicast or multicast. Secure authentication and protection mechanisms including IPSEC are implemented in the content provider gateway. Data files 905 are transmitted using a store-and-forward transmission architecture, utilizing conventional file transfer and may be secured using IPSEC, SSL, or S-HTTP to reduce the risk of exposing that information to interception by third parties.

One such attempt to provide such a secure transmission channel is a secure payment technology such as Secure Electronic Transaction (hereinafter "SET"), jointly developed by the Visa and MasterCard card associations, and described in Visa and MasterCard's Secure Electronic Transaction (SET) Specification, Feb. 23, 1996, hereby incorporated by reference. Other such secure payment technologies include Secure Transaction Technology ("STT"), Secure Electronic Payments Protocol ("SEPP"), Internet Keyed Payments ("iKP"), Net Trust, and Cybercash Credit Payment Protocol. One of ordinary skill in the art will readily comprehend that any of the secure payment technologies can be substituted for the SET protocol without undue experimentation.

Another such attempt to provide such a secure transmission channel is a general-purpose secure communication protocol such as Netscape, Inc.'s Secure Sockets Layer (hereinafter "SSL"), as described in Freier, Karlton & Kocher (hereinafter "Freier"), The SSL Protocol Version 3.0, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Theresa Systems, Shen, Kerberos, Photuris, Pretty Good Privacy ("PGP") and Ipv6 which meets the IPSEC criteria. One of ordinary skill in the art will readily comprehend that any of the general-purpose secure communication protocols can be substituted for the SSL transmission protocol without undue experimentation.

The content provider gateway 910 packages the data in packets for transmission to the broadcast operation center. The content provider facility encrypts all data at the application level. Data streams 900 have a high priority as a function of the urgent or real-time nature of the data, and are transmitted to the output gateway in the broadcast operation center to speed passage of the data. Data files 905 have lower priority than data streams 900, and are managed by the broadcast operation center on a scheduled basis. The content provider facility 910 communicates to the broadcast operation center via a network using TCP/IP protocol. The communication link between the content provider gateway 910 in the content provider facility and the schedule gateway 915 in the broadcast operation center is a secure SSL or S-HTTP protocol. The content provider gateway 910 and the schedule gateway 915 exchange information on the scheduling of transmission of data files 905. More specifically, transmission of data files 905 is scheduled, revised and queried by the schedule gateway 915. The content provider gateway 910 transmits scheduled data files 905 to the schedule gateway 920 via a network connection using Unicast, and either File Transfer Protocol (FTP) or IPSEC. The file gateway 920 writes the data files 905 to the file store 925, a data storage medium, and forwards the data files 905 to the output gateways 930 at the direction of the subscription manager 935. The subscription manager 935 transmits scheduling information to the output gateways 930.

FIG. 10 illustrates the output gateways communicating with the uplink facility of the source in accordance with a preferred embodiment. The content provider gateway 1000 transmits data streams to the stream gateway 1010, circumventing the store-and-forward function that data files are subject to. The stream gateway 1010 functions as a File Transfer Protocol (FTP) proxy gateway, and an Internet Protocol (IP) circuit gateway. The subscription manager 1020 transmits to the stream gateway 1010, the playout gateway 1030, and the repair gateway 1040 information that uniquely identifies data that passes through each of the respective gateways. This information enables the respective gateways to multiplex authentication and session information including a multicast address, unique identifier, the destination uplink, timing, checksum, and format information into the data stream. Simultaneous delivery of data streams and data files at the destination can be coordinated by multiplexing authentication and session information in the data streams and data files accordingly. The stream gateway 1010 and the playout gateway 1030 monitor the timeliness of data to the uplink gateways. The playout gateway 1030 and the repair gateway 1040 will retrieve data files from the file store 1050 under the management of the subscription manager 1020.

The output gateways will transmit data to the uplink gateways based on the multiplexed session information, which is either the Internet multicast gateway 1060, the fixed service satellite (FSS) uplink gateway 1070, or the digital broadcast satellite (DBS) uplink gateway 1080. Examples of DBS services are Direct TV and ASkyB. The uplink gateways will convert protocols and generate frames as appropriately indicated by the session information and the requirements of the respective uplink facilities. Data is transmitted by the stream gateway 1010 to the uplink gateways via RTP.

Figure 11:
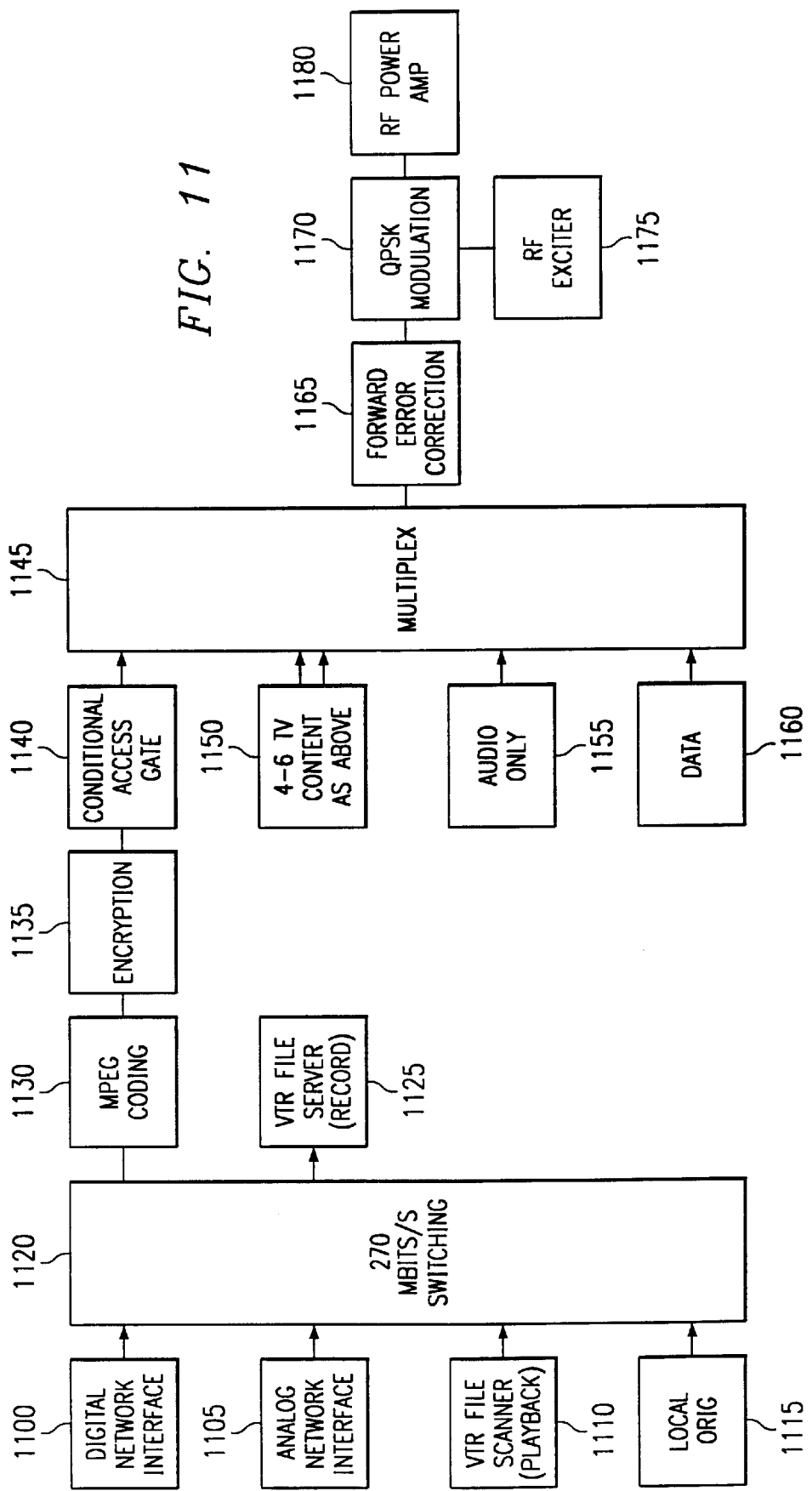
FIG. 11 illustrates the uplink technical core in accordance with a preferred embodiment.

FIG. 11 illustrates the uplink technical core in accordance with a preferred embodiment. Data files are transmitted by the output gateways of the broadcast operation center of the source via a digital network interface 1100. Data steams are transmitted via an analog network interface 1105, analog data is transmitted via video tape recorder 1110, or data is transmitted via a local content feed 1115 into a 270 megabit per second network backbone 1120. A record of each transmission is made to a video tape recorder server 1125. The data is encoded conforming to MPEG, Indeo or H.261 standards 1130 and encrypted 1135. The data is encrypted according to conditional access (CA) protocol 1140 and multiplexed 1145 with authentication and session information including a unique identifier, the destination uplink, timing, multicast address, checksum, and format information into the data stream. The multiplexed data is mixed with 4–6 television content 1150, audio 1155, and data 1160. Forward error correction (FEC) is added to the data 1165. The data is transmitted and modulated according to quadrature phase shift keying (QPSK) specifications 1170, a Radio Frequency (RF) exciter intervenes in the data transmission 1175, and an RF power amplifier amplifies the data signal 1180.

Receiving Facility

Figure 12:
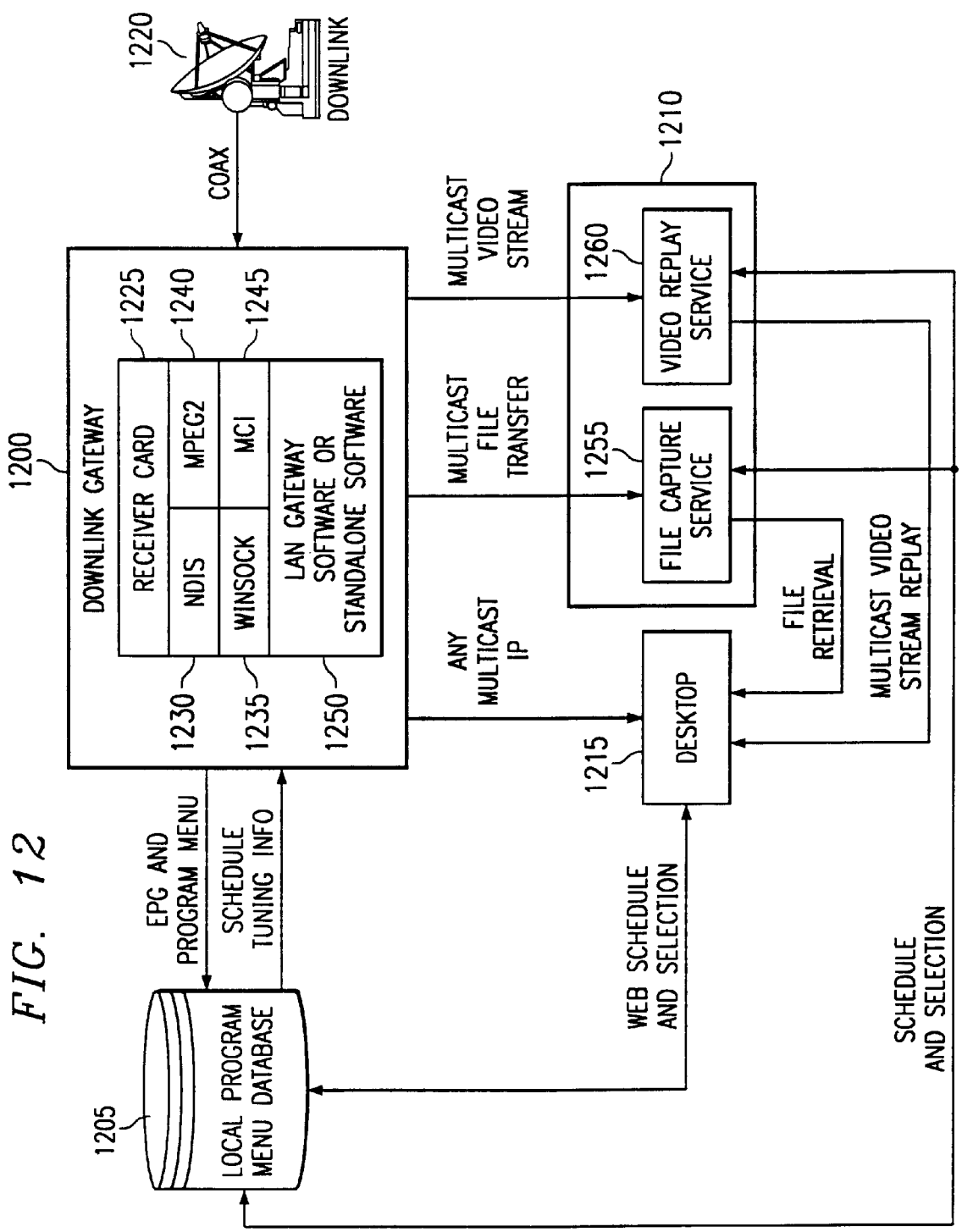
FIGS. 12 illustrates the receiving facility in accordance with a preferred embodiment.

FIG. 12 illustrates the receiving facility in accordance with a preferred embodiment. The receiving facility includes four primary components, a downlink gateway 1200, a local program menu database 1205, application services 1210 and one or more client computers 1215. Data that is received by a satellite receiver 140 is transmitted to a satellite downlink gateway 1200. The satellite receiver 140 is connected to the downlink gateway 1200 via a coaxial cable which is a type of cable with a solid central conductor surrounded by an insulator, surrounded by a cylindrical shield woven from fine wires. The shield is connected to an electrical ground to reduce electrical interference. Coaxial cable is typically used to carry high frequency signals including video or radio.

The downlink gateway 1200 removes the satellite protocols from the data and frames that were added to the data by the uplink facilities before satellite transmission, yielding the data multiplexed with the authentication and session information. A downlink gateway 1200 includes one or more receiver cards 1225 that include a tuner, tuner control and satellite decoders. The data is transmitted by the receiver card(s) 1225 to the NDIS 1230 and the WINSOCK 1235 layers of software or through the MPEG-2 compliant 1240 and the MCI compliant 1245 layers of software. Then the data is reformed into IP packets for transmission on a local area network, or not reformed, as indicated by the multiplexed destination information in the data 1250.

IP is designed for use in interconnected systems of packet-switched computer communication networks, and provides for transmitting blocks of data called datagrams from sources to destinations, where sources and destinations are hosts identified by fixed length addresses. IP also provides for fragmentation and reassembly of long datagrams, if necessary, for transmission through "small packet" networks. The model of operation requires an IP compliant module to reside in each host engaged in IP communication and in each gateway that interconnects networks. These modules share common rules for interpreting address fields and for fragmenting and assembling IP datagrams. In addition, these modules (especially in gateways) have procedures for making routing decisions and other functions. IP treats each IP datagram as an independent entity unrelated to any other IP datagram. There are no connections or logical circuits (virtual or otherwise).

The data is transmitted either directly to a destination standalone client computer 1215 using a multicast IP protocol, or indirectly to one or more client computers 1215 through the application services 1210. The application services 1210 utilize a file capture service 1255 using a file retrieval mechanism where the data is files, or a video replay service 1260 using a multicast video steam replay mechanism if the data is streamed. A local program menu database 1205 controls which data is transmitted at what time utilizing authentication and session information multiplexed into the data between the downlink gateway 1200, the application services 1210 and one or more client computers 1215.

Alternative Architectures

FIGS. 13 illustrates the layered system architecture in accordance with a preferred embodiment. Stream data is managed at the highest level by video storage and retrieval services 1300 that is supported by lower level real time transport services 1310 of the stream data. In comparison, data files are managed by caching and proxy services 1320 that are supported by web transport 1330 Internet protocols. All data services are supported by IP multicast services 1340 that have real-time transport capabilities for transport of stream data and store-and-forward capabilities for transport of data files. IP multicast services 1340 are directly supported by satellite bitpipes 1350. Stream data is transported by different software mechanisms than data files because generally the priority and criticality of the data is much higher for stream data than for data files.

Figure 14:
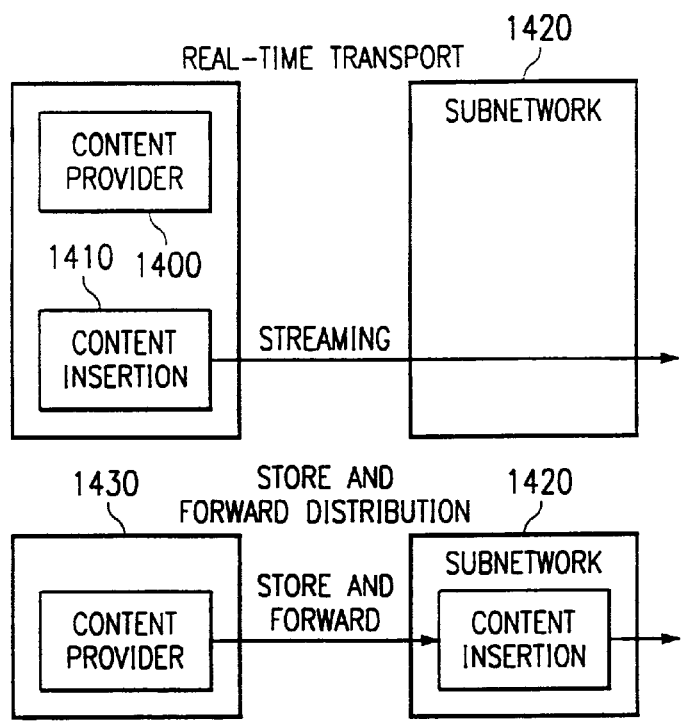
FIG. 14 illustrates the application services layer in accordance with a preferred embodiment.

FIG. 14 illustrates the application services layer in accordance with a preferred embodiment. In an application of stream data, the content provider 1400 inserts stream data 1410 into the delivery subnetwork 1420. The delivery subnetwork has reserved bandwidth streams for transportation of video service and available non-reserved bandwidth streams for data file transportation. In comparison, in an application of file data, the content provider 1430 inserts file data into the delivery subnetwork 1420 where the data may be stored for a period of time and then forwarded through the delivery subnetwork 1420.

Figure 15:
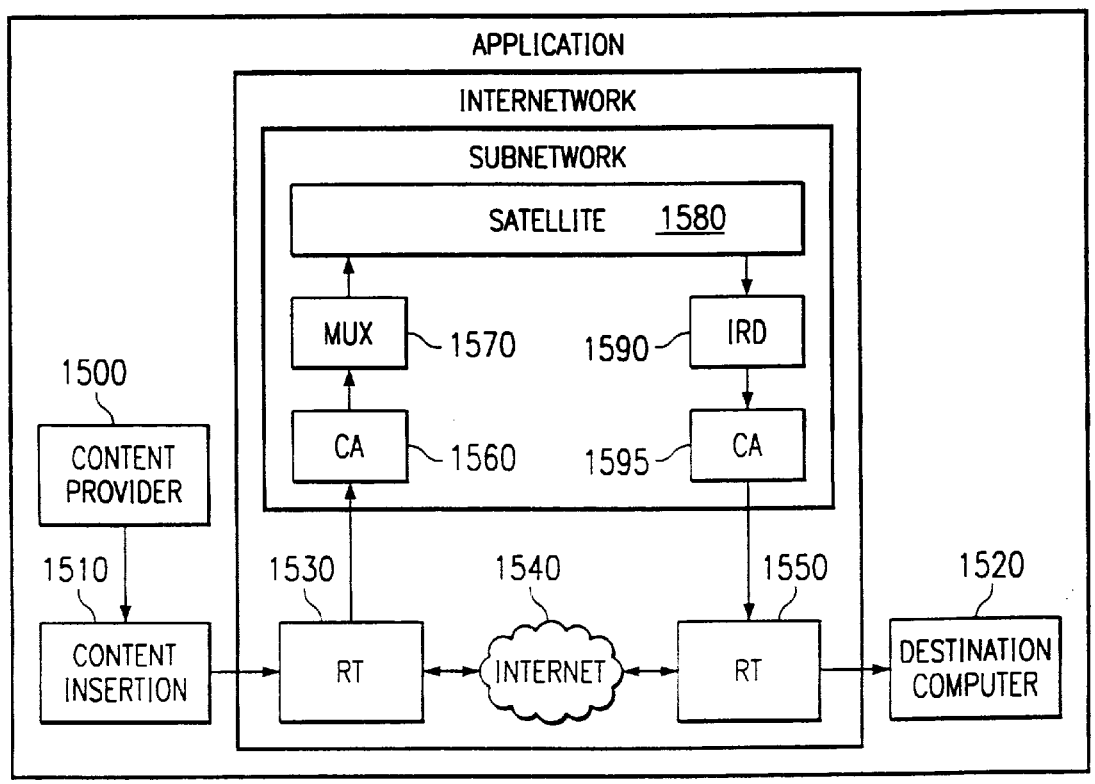
FIG. 15 illustrates the functional decomposition of architectural layers in accordance with a preferred embodiment.

FIG. 15 illustrates the functional decomposition of architectural layers in accordance with a preferred embodiment.

At the application level of the system function, the content provider 1500 performs content insertion 1510 into the Internetwork, the data is transmitted through the Internetwork to the destination computer 1520. At the Internetwork level, the incoming data is routed 1530 either to the subnetwork or the Internet 1540. Upon passage through either route, it is lastly routed 1550 to the destination computer 1520. At the subnetwork level, the incoming data is received by a conditional access (CA) device 1560, and transmitted to a multiplexer (MUX) 1570 in preparation for satellite transmission, then it is transmitted through the satellite 1580 to the integrated receiver decoder (IRD) 1590, and transmitted to a conditional access (CA) device 1595 and then transmitted to the router 1550, and finally to the destination computer 1520.

Figure 16:
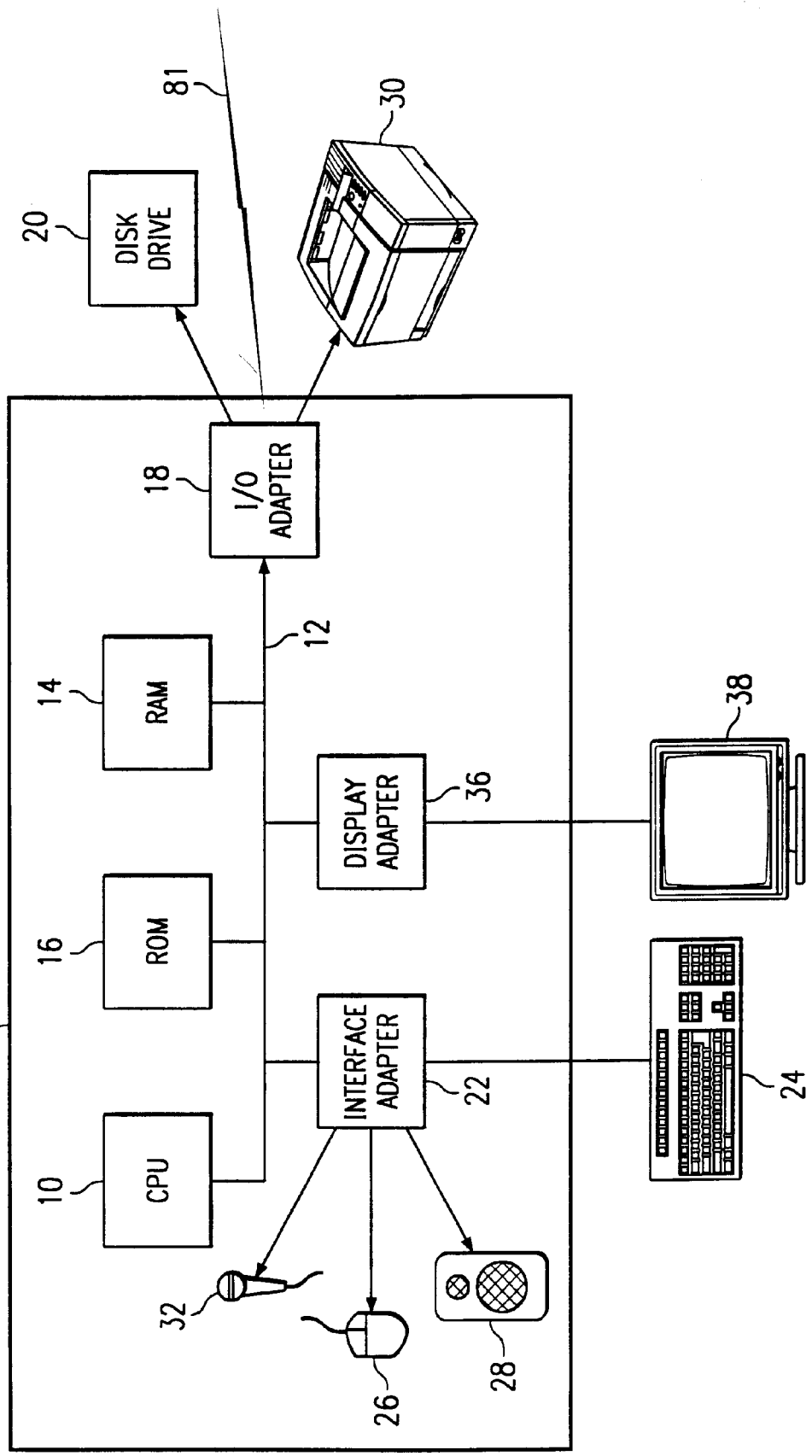
FIG. 16 is a block schematic diagram of a computer system, for example, a personal computer system on which the inventive information manager operates at numerous points on the system, including the source, the receiving facility and the destinations.

FIG. 16 is a block-schematic diagram of a computer system, for example, a personal computer system on which the inventive information manager operates at numerous points on the system, including the source, the receiving facility and the destinations. The computer 1600 is controlled by a central processing unit 1605 (which may be a conventional microprocessor) and a number of other units, all interconnected via a system bus 1620, are provided to accomplish specific tasks. Although a particular computer may only have some of the units illustrated in FIG. 16, or may have additional components not shown, most server computers will include at least the units shown.

Specifically, computer 1600 shown in FIG. 16 includes a random access memory (RAM) 1615 for temporary storage of information, a read only memory (ROM) 1610 for permanent storage of the computer's configuration and basic operating commands, and an input/output (I/O) adapter 1630 for connecting peripheral or network devices, including a disk unit 1625 and printer 1635, to the bus 1620, via cables 1640 or peripheral bus 1620, respectively. A user interface adapter 1645 is also provided for connecting input devices, including a keyboard 1650, and other known interface devices, including mice, speakers, and microphones to the bus 1620. Visual output is provided by a display adapter 1655 which connects the bus 1620 to a display device 1660, including a video monitor. The computer has resident thereon and is controlled and coordinated by operating system software including the SUN Solaris, Windows NT, or JavaOS operating system.

Security

Security provisions to prevent unauthorized access to data are implemented at all architectural layers of this embodiment of the invention. At the subnetwork level, conditional access (CA) is implemented at the source before the data is multiplexed as shown in FIG. 15. Internetwork layer security (IPSEC) is implemented by the content provide gateway as shown in FIG. 9. Furthermore, security provisions for authentication of the user and protection of the data can be implemented outside the inventive information manager, passing through the inventive information manager transparently with no modification by the inventive information manager; end-to-end security implemented by the user of the inventive information manager is independent of the function of the inventive information manager and the security policy of the user of the inventive information manager is independent of the security provisions implemented by the inventive information manager.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A method for media communication over a network supporting an Internet Protocol from a source computer to one or more destinations through a receiving facility, comprising:

receiving data from a source computer destined for one or more destinations;

selectively routing the data via either a network that supports Internet Protocol or via a satellite transmission network based on a size of the data;

in response to routing the data via the satellite transmission network, multicasting the data from the source computer via a satellite utilizing an Internet Protocol to facilitate routing;

receiving the data at the receiving facility;

transmitting the data from the receiving facility to each of the destinations via the network that supports Internet Protocol; and receiving the data at the one or more destinations with Internet Protocol addresses attached via the network that supports Internet Protocol.

2. A method for media communication over a network as recited in claim 1, including the step of transmitting the status of the source computer transmission from the receiving facility to the source computer and if the status indicates transmission failure then transmitting the data and destination addresses from the source computer to the receiving facility.

3. A method for media communication over a network as recited in claim 1, wherein multicasting is implemented through TCP/IP.

4. A method for media communication over a network as recited in claim 1, including the step of encoding and encrypting the data for security.

5. A method for media communication over a network as recited in claim 1, wherein the data is stream data.

6. A method for media communication over a network as recited in claim 1, wherein the data is file data.

7. A method for media communication over a network as recited in claim 1, wherein the network is the Internet.

8. The method of claim 1, wherein the selective routing includes:

selectively routing the data via either the network that supports Internet Protocol or the satellite transmission network based on the size of the data and a distance between the source computer and the one or more destinations.

9. A computer system that facilitates data communication to one or more destinations, comprising:

a satellite transmission network;

a network that supports Internet Protocol;

a source computer for selectively multicasting data to one or more destinations via either the satellite transmission network or the network that supports Internet Protocol based on a distance between the source computer and the one or more destinations;

a receiving facility that receives the data from the satellite transmission network and the network that supports Internet Protocol and that transmits the data to each of the one or more destinations via the network that supports the Internet Protocol.

10. A computer system for media communication over a network as recited in claim 9, wherein the receiving facility transmits to the source computer the status of the transmission from the source computer and if the status indicates transmission failure, then the source computer transmits the data and destination addresses to the receiving facility.

11. A computer system for media communication over a network as recited in claim 9, wherein multicasting is implemented utilizing TCP/IP.

12. A computer system for media communication over a network as recited in claim 9, wherein the data is encoded and encrypted.

13. A computer system for media communication over a network as recited in claim 9, wherein the data is stream data.

14. A computer system for media communication over a network as recited in claim 9, wherein the data is file data.

15. A computer system for media communication over a network as recited in claim 9, wherein the communication link between the source and the receiving facility includes the Internet.

16. The computer system of claim 9, wherein the source computer is configured to selectively multicast the data via either the satellite transmission network or the network that supports Internet Protocol based on the distance between the source computer and the one or more destinations and a size of the data.

17. A system for multicast transmission of data, comprising:
   a satellite transmission network;
   an internet;
   a first router for selectively routing data from a source and addressed to one or more destinations via either the satellite transmission network or the internet based on a distance between the source and the one or more destinations; and
   a second router for receiving the data from either the satellite transmission network or the internet and routing the data to one or more of the one or more destinations.

18. The system of claim 17, wherein the satellite transmission network, comprises:
   a conditional access device for receiving the data from the content insertion;
   a multiplexer;
   a satellite; and
   an integrated receiver decoder.

19. The system of claim 17, further comprising:
   a content insertion for receiving data from one or more content sources and routing the data to the first router.

20. The system of claim 17, wherein the first router is configured to selectively route the data via either the satellite transmission network or the internet based on the distance between the source and the one or more destinations and a size of the data.

21. A system that facilitates data communication to one or more destinations, comprising:
   a satellite transmission network;
   a network that supports Internet Protocol;
   a source computer for multicasting messages to one or more destinations via either the satellite transmission network, or the network that supports Internet Protocol, based on a size of each of the messages; and
   a receiving facility that receives the data from the satellite transmission network and the network that supports Internet Protocol and that transmits the messages to each of the one or more destinations via the network that supports the Internet Protocol.

22. The system of claim 21, wherein the multicasting of messages to one or more destinations via either the satellite transmission network, or the network that supports Internet Protocol, is further based on a distance between the source computer and each of the one or more destinations.

* * * * *